United States Patent [19]

Sugio et al.

[11] 4,343,929

[45] Aug. 10, 1982

[54] PROCESS FOR CONTINUOUSLY POLYMERIZING TRIOXANE

[75] Inventors: Akitoshi Sugio, Ohmiya; Kazuyoshi Taka, Yokkaichi; Akira Amemiya, Tokyo; Tomotaka Furusawa, Matsudo; Mutsuhiko Takeda, Yokkaichi; Katsumasa Tanaka, Yokkaichi; Toshikazu Umemura, Yokkaichi; Yoshihiro Ono, Yokkaichi, all of Japan

[73] Assignee: Mitsubishi Gas Chemical Co., Inc., Tokyo, Japan

[21] Appl. No.: 200,065

[22] Filed: Oct. 23, 1980

[30] Foreign Application Priority Data

Oct. 23, 1979 [JP] Japan ............................. 54-135868

[51] Int. Cl.³ .......................................... C08G 2/10
[52] U.S. Cl. ................................. 528/241; 366/83; 366/84; 366/85; 366/97; 422/135; 422/137; 528/230; 528/249; 528/250; 528/232
[58] Field of Search ................ 366/83, 84, 85, 97; 422/134, 135, 137; 528/249, 250, 230, 241, 232; 526/65

[56] References Cited

U.S. PATENT DOCUMENTS

| 3,388,196 | 6/1968 | Farrell | 366/84 |
| 4,105,637 | 8/1978 | Semanchik et al. | 528/241 |
| 4,115,369 | 9/1978 | Sugio et al. | 528/250 |

FOREIGN PATENT DOCUMENTS 1199721  7/1970  United Kingdom ................ 366/83

Primary Examiner—Wilbert J. Briggs, Sr.
Attorney, Agent, or Firm—Wenderoth, Lind & Ponack

[57] ABSTRACT

A process for producing a polyacetal homopolymer or copolymer which comprises continuously feeding a liquid starting mixture containing molten trioxane and a catalyst and optionally a comonomer through a feed opening of a reactor, said reactor being a continuously stirring-type mixer having two stirring shafts having a plurality of plate-like paddles fixed thereto the cross-section of each of said paddles taken perpendicularly of the axial direction of the stirring shaft having a shape of a convex lens, an ellipse or a quasipolygon inscribing a phantom circle at each vertex, one of said paddles facing another paddle fixed to the other stirring shaft and said one paddle being positioned such that it rotates while the edges thereof keep a slight clearance from the inner surface of the barrel and the other paddle; polymerizing the starting mixture while moving it toward the discharge opening by the rotation of the paddles, the improvement wherein the profiles of the paddles are changed, or the arrangement of the paddles is changed continuously or stepwise, so that the transportability of the reaction mixture becomes progressively smaller from the feed opening toward the discharge opening of the reactor.

24 Claims, 9 Drawing Figures

PROCESS FOR CONTINUOUSLY POLYMERIZING TRIOXANE

This invention relates to a process for producing polyacetal. More specifically, this invention relates to a process for producing a polyacetal homopolymer or copolymer by homo- or co-polymerizing trioxane in bulk.

Various methods and apparatuses have been proposed heretofore for the bulk polymerization of trioxane. For example, for use in continuous bulk polymerization of trioxane, U.S. Pat. No. 4,105,637 proposed a polymerization reactor comprising a long case located substantially along the outer boundary of a pair of shafts and, secured to each of said shafts, a plurality of elliptical shaped plates having flattened edges in the direction of their long-axes, said elliptical shaped plates being intermeshed with each other such that their flattened edges wipe the surfaces of the mating elliptical plates. The present inventors previously found that reactors including convex lens-like plate paddles having sharp edges, or convex lens-like or quasipolygonal plate paddles having sharp scrapers were very effective. Later, however, they noted that when the arrangement of the paddles is not proper in such reactors, there is scarcely any increase in polymer conversion, and the desired operation fails owing to the torque-out of the reactors, etc. Based on the finding that the arrangement of paddles drastically changes the state of the polymerization reaction or the operation of the reactor, the present inventors made extensive investigations in order to develop a process which would make possible stable operation at desirable polymer conversions. These investigations have led to the present invention.

According to this invention, there is provided a process for producing a polyacetal homopolymer or copolymer which comprises continuously feeding a liquid starting mixture containing molten trioxane and a catalyst and optionally a comonomer through a feed opening of a reactor, said reactor being a continuously stirring-type mixer comprising a hollow barrel having in spaced-apart relationship said feed opening for the starting materials and a discharge opening for the reaction product, said barrel having a cross-sectional surface corresponding to two overlapping eccentric circles having the same diameter, a jacket provided on the periphery of the barrel for temperature control, and stirring shafts disposed within the hollow barrel parallel to each other and extending longitudinally of the barrel through the central parts of said circles, said stirring shafts having a plurality of plate-like paddles fixed thereto in such a manner that the paddles fixed to one stirring shaft are kept in contact with each other, the cross-section of each of said paddles taken perpendicularly of the axial direction of the stirring shaft having a shape of a convex lens, an ellipse or a quasipolygon inscribing a phantom circle at each vertex, one of said paddles facing another paddle fixed to the other stirring shaft and said one paddle being positioned such that it rotates while the edges thereof keep a slight clearance from the inner surface of the barrel and the other paddle; polymerizing the starting mixture while moving it toward the discharge opening by the rotation of the paddles; and withdrawing the reaction product in the form of a finely divided solid from the discharge opening, characterized in that the profiles of the paddles are changed or the arrangement of the paddles is changed continuously or stepwise so that the transportability of the reaction mixture becomes progressively smaller from the feed opening toward the discharge opening of the reactor.

The present invention is described in detail below with reference to the accompanying drawings in which.

Figure 1:
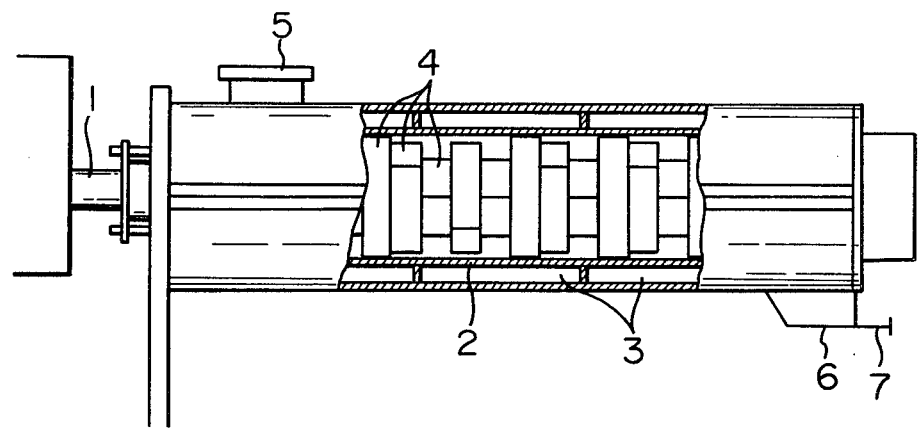
FIG. 1 is a partial sectional side elevation schematically showing one embodiment of the reactor used in this invention.
Figure 2:
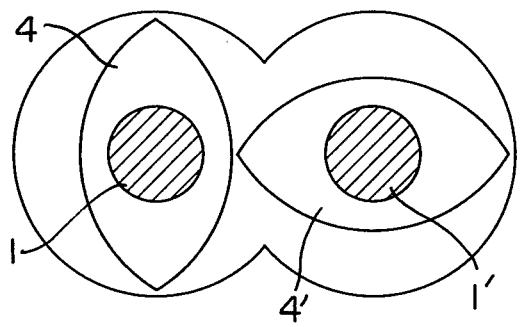
FIG. 2 is a partial sectional front elevation showing the profile of a convex lens-type paddle, (A) showing a flat paddle and (B) showing a helical paddle.
Figure 2:
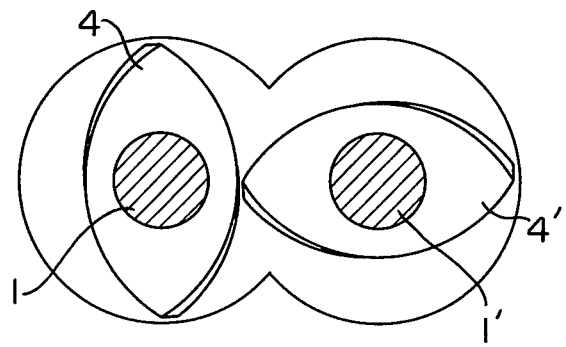

FIG. 1 schematically shows a reactor in accordance with this invention having a hollow barrel whose cross-section is 8-figured with overlapping of two eccentric circles having the same diameter and in which convex lens-shaped paddles are fixed. FIG. 2 schematically shows a partial cross section of the reactor shown in FIG. 1 which is taken perpendicularly to the axial direction of the stirring shaft.

Referring to FIGS. 1 and 2, the reactor used in this invention is a continuously stirring-type mixer in which the rotating of shafts 1 and 1' produces a self-cleaning action on the inside surface of the mixer. The periphery of a barrel 2 has a heating or cooling jacket 3 which may optionally have a plurality of sections capable of performing temperature control independently from each other. The insides of the stirring shafts 1 and 1' in the barrel 2 may be of a structure through which a heating or cooling medium can be passed. To the two stirring shafts 1 and 1' are respectively fixed a plurality of paddles 4, 4' ... whose contour is of a convex lens shape and whose cross-section has a plane including the long axis as a symmetrical plane. The paddles have a flat side surface as shown in FIG. 2, (A), or a helical side surface as shown in FIG. 2, (B). By a combination of the paddles 4, 4', ..., the reaction mixture can be transported suitably for a change in its phase. The two stirring shafts 1 and 1' rotate in the same direction, and in the same cross section, one paddle fixed to the stirring shaft 1 faces another paddle fixed to the stirring shaft 1', and the edge of the paddle 4 of the stirring shaft 1 keeps a slight clearance during rotation from the side surface of the paddle 4' of the other stirring shaft 1' and from the inside surface of the barrel 2. Accordingly, the starting materials are vigorously mixed while they incessantly undergo compression and expansion owing to incessant changes in the volume of the space formed between the paddles 4, 4' ... and the barrel 2. The distance between the stirring shaft 1 having the paddles 4 fixed thereto and the shaft 1' having the paddles 4' fixed thereto, namely the overlapping of the two circles in the cross-section of the hollow barrel, is such that the angle formed by connecting the centers of the two circles to a point of intersection of the two circles on their circumference is preferably about 80° to about 100°, more preferably 85° to 90°. By setting the distance between the stirring shafts 1 and 1' in this way, mutual cleaning of the paddles 4 and 4' can be performed advantageously. The clearance between the edge of each of the paddles 4 and 4' and the barrel 2 is not more than 2%, preferably not more than 1%, of the diameter of a circle circumscribing the paddle, and the clearance between the edge of a paddle fixed to one stirring shaft and the side surface of a mating paddle fixed to the other stirring shaft is not more than 5 times preferably not more than 2 times, the first-mentioned clearance. When the clearance is larger, it is impossible to obtain the polymerization product in finely divided form, and the scale deposited thickly to the inside surface of the barrel hampers heat transmission from the jacket to the barrel, frequently resulting in the difficulty of controlling the reaction temperature.

The paddle having a cross section resembling a convex lens as shown in FIG. 2 (A) and (B) may optionally be sharpened at their end portions. The end portions may also be made of a hard material welded thereto. The sharp end portions have an effect of shaving off the scale deposited on the inside surface of the barrel.

Figure 3A:
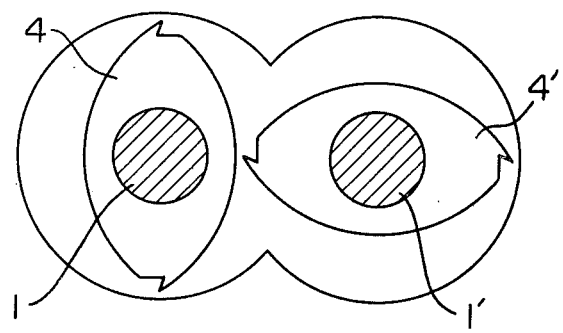
FIG. 3 is a partial sectional front elevation of one example of the profile of a convex lens-type paddle equipped with a scraper, (A) showing flat paddles and (B) showing helical paddles.
Figure 3B:
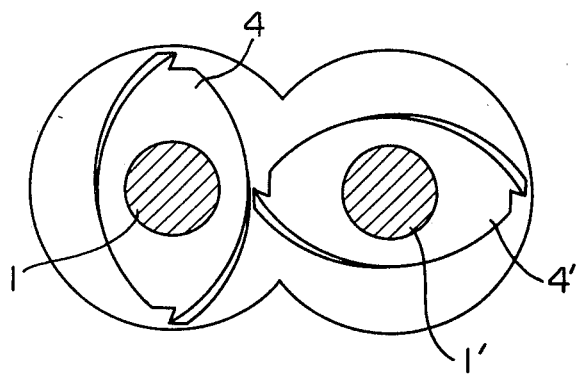
Figure 5:
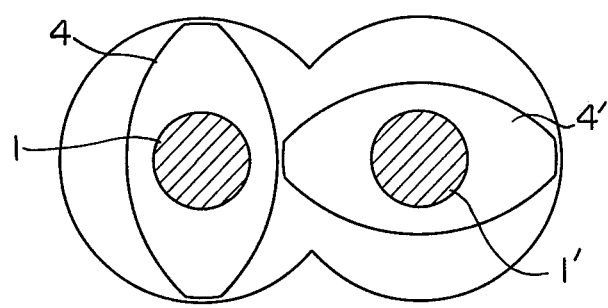
FIG. 5 is a view showing elliptical paddles.

As shown in FIGS. 3, (A) and (B), there can also be used a paddle whose cross-section taken perpendicularly of the axial direction of the stirring shaft has a shape of a convex lens and in which the end portions in the aforesaid cross section are equipped with a sharp scraper whose plane containing the long axis is not a symmetrical plane. Such a paddle is very effective for shaving off the scale. An elliptical paddle resulting from flattening the end portions of a convex lens shape as shown in FIG. 5 can also be used. There can also be used a paddle in which the cross section taken perpendicularly of the axial direction of the stirring shaft is a quasipolygonal shape, for example a quasitriangular shape shown in FIG. 6, which inscribes a phantom circle at each end. A paddle with such a quasipolygonal cross section in which a sharp scraper is fitted to the end portions can equally be used.

The thickness of the plate-like paddle is desirably about 1/20 to 1/5 of the diameter of a circle circumscribing the paddle.

Investigations of the present inventors have shown that in the continuous bulk polymerization of trioxane in the above-described continuously stirring-type mixer, the reaction mixture in the mixer is a liquid when it contains at least about 90% by weight of the unreacted monomer, a slurry when it contains about 90 to about 70% by weight of the unreacted monomer, a creamy mass or a sticky powder when it is about 70 to 40% by weight, and a non-tacky powder when it is less than about 40% by weight.

In addition, in the continuous bulk polymerization of trioxane, the liquid reaction mixture which has a viscosity of several centipoises at the initial stage of the reaction changes from the aforesaid slurry to a solid state in several minutes. Investigations of the present inventors have shown that in order to continue the operation of the stirring mixer stably in response to such an abrupt change in phase in such a manner as to mix the reaction mixture smoothly, move it from the feed opening to the discharge opening and bring about a desirable conversion, it is necessary that the arrangement of paddles ranging from the material feed opening to the discharge opening for the reaction product be such that the transportability of the reaction mixture passing through the spaces among the paddles gradually decreases as a result of its stepwise or continuous change in the aforesaid direction.

In the case of convex lens-like or elliptical paddles having one symmetrical axis of 180° rotation, with respect to one paddle, a paddle adjacent thereto on the discharge opening side of the reactor has a smaller effect of transportability when it is deviated by 90° in a direction opposite (to be referred to as a negative direction) to the rotating direction of the stirring shaft than when it is deviated by 45° in the negative direction. It has a much smaller effect of transportability when it is deviated by 135° in the negative direction, i.e. by 45° in the rotating direction of the stirring shaft (to be referred to as a positive direction), with respect to the aforesaid one paddle.

In the case of quasitriangular paddles having a symmetrical axis of 120° rotation, with respect to one paddle, a paddle adjacent thereto on the discharge opening side has a smaller effect of transportability when it is deviated by 30° in the negative direction than when it is deviated by 60° in the negative direction, and has a much smaller effect of transportability when it is deviated by 90° in the negative direction.

The basic concept of the paddle arrangement in this invention is that as shown above, with respect to one paddle, a paddle or paddles adjacent thereto on the discharge opening side of the reactor are deviated in the negative direction from the material feed opening toward the discharge opening for the reaction product.

Specifically, when with respect to a first paddle, an adjoining second paddle is deviated by 45° in the negative direction and an adjoining third paddle is deviated by 45° in the negative direction, the angle of deviation of the second paddle from the first paddle and the angle of deviation of the third paddle from the second paddle are both 45°, and therefore, the effect of transportability resulting from the arrangement of the first and second paddles is equal to the that resulting from the arrangement of the second and third paddles.

On the other hand, when in the above case, the third paddle is deviated by 90° with respect to the second paddle, the angle of deviation of the third paddle from the second paddle is 90° and exceeds the angle of deviation of the second paddle from the first paddle (45°). Thus, in this case, the effect of transportability resulting from the second and third paddles is smaller than that resulting from the arrangement of the first and second paddles. This is a typical embodiment of paddle arrangement in which the transportability of the reaction mixture in this invention becomes gradually smaller continuously. In other words, the transportability of the reaction mixture can be continuously made smaller by successively changing the angle of deviation in the negative direction of one paddle from another paddle adjoining thereto on the discharge opening side from the material feed opening toward the discharge opening of the reaction product.

If a continuously stirring-type mixer is divided into three zones ranging from the material feed opening to the product discharge opening and there are used a combination of paddles deviated by 45° in the negative direction in a first zone (as stated above, it may safely be assumed that there is substantially no difference in the effect of transportability among the paddles in this zone), a combination of paddles deviated by 90° in the negative direction in a second zone, and a combination of paddles deviated by 135° in the negative direction (i.e. by 45° in the positive direction) in a third zone, it may safely be assumed that there is no substantial difference in the effect of feed among the paddles in the same zone, but among the three zones, there is evidently a difference in the effect of transportability of the reaction mixture, and the effect of transportability becomes gradually smaller from the material feed opening toward the product discharge opening. This is, therefore, a typical example of paddle arrangement in this invention in which the effect of transportability of the reaction mixture becomes progressively smaller.

When in the second zone, a second paddle is deviated by 45° with respect to a first paddle and a third paddle is deviated by 90° with respect to the second paddle, and combinations of these paddles with deviation angles of 45° and 90° are repeatedly arranged, and when in the third zone, a second paddle is deviated by 45° with respect to a first paddle, a third paddle is deviated by 90° with respect to the second paddle, and a fourth paddle is deviated by 90° with respect to the third paddle and combinations of these paddles with deviation angles of 45°, 90° and 90° are repeatedly arranged, there is a difference in the effect of transportability of the reaction mixture among the three zones, and the effect becomes gradually smaller as the reaction mixture is transported from the material feed opening toward the reaction product discharge opening. Accordingly, this is another typical example of paddle arrangement in which the transportability of the reaction mixture becomes gradually smaller.

It should be understood that the absolute values of deviation angles given in the above description are for illustration, and they only have relative meanings.

Helical paddles such as illustrated in FIG. 2 (B) and FIG. 3 (B) can also be used as the paddles in this invention. In such a paddle, both sides between its end portions are symmetrically twisted, and are symmetrical to each other with respect to the stirring shaft as an axis of rotation. These helical paddles are worked such that their side surfaces are twisted so as to push the reaction mixture toward the discharge opening by the rotation of the stirring shaft. A combination of these helical paddles has a greater effect of transportability than a combination of ordinary flat paddles at the same angle. Besides these forward pass-type helical paddles, there can also be used inverse helical paddles which are worked such that their side surfaces are twisted so as to return the reaction mixture toward the feed opening when the stirring shaft rotates. A combination of these inverse helical paddles has a smaller effect of transportability than a combination of flat paddles at the same angle. It is also possible to provide intermeshing screws forwardly and rearwardly of a zone formed of such paddles. A combination of paddles having different thicknesses can also be used.

Accordingly, the process of this invention encompasses the use of screws or paddles of the above-mentioned types which progressively decrease the transportability of the reaction mixture as it advances from the material feed opening toward the product discharge opening.

Investigations of the present inventors have shown that it is desirable to progressively decrease the effect of transporting the reaction mixture from the material feed opening toward the product discharge opening in response to changes in the state of the reaction mixture in the bulk polymerization of trioxane in a continuously stirring-type mixer.

In a zone in which the reaction mixture is in the form of a creamy mass or a sticky fine powder with an unreacted monomer content of about 70 to about 40% by weight, the speed of movement of the reaction mixture becomes minimum and overfilling tends to occur. It is desirable therefore that in a zone in which the content of the unreacted monomer is at least 50% by weight, especially at least 60% by weight, the angle of deviation of one paddle on the discharge opening side from an adjoining paddle upstream thereof be not more than about 90° in the negative direction if these paddles are convex lens-like or elliptical.

Likewise, the angle of deviation should desirably be not more than about 90° in the negative direction in a zone in which the reaction mixture has a higher content of the unreacted monomer and is liquid or slurry-like. When the angle of deviation is more than about 90°, a creamy mass or a sticky fine powder tends to form in this zone. In the most preferred embodiment in this invention, it is desirable to employ in a zone in which the reaction mixture contains at least about 50% by weight of the unreacted monomer, such a paddle arrangement that in an area near the feed opening, a paddle on the discharge opening side is deviated by an angle of 45° in the negative direction with respect to an adjoining paddle upstream thereof, and in a subsequent area, paddles are alternately arranged in deviation angles of 45° and 90° in the negative direction, and/or are repeatedly arranged in deviation angles of 45°, 90° and 90° in the negative direction.

In a zone, subsequent to the aforesaid zone, in which the content of the unreacted monomer is less than about 50% by weight, paddles may be arranged alternately in deviation angles of 45° and 90° in the negative direction and/or repeatedly arranged in deviation angles of 45°, 90° and 90° in the negative direction. However, since excessively little filling tends to occur gradually as the content of the unreacted monomer decreases, it is possible, for prevention of the excessively little filling, to arrange paddles at a deviation angle in the negative direction of 90° only, 135° only, or alternately 90° and 135°, or repeatedly at deviation angles of 90°, 90° and 135°, near the discharge opening for the reaction product.

By using a combination of paddles having different transporting effects among the individual reaction zones, the ratio of filling of the reaction mixture in the reactor can be maintained substantially equal throughout the entire reaction system. Since the reaction mixture serves as a kind of roll between paddles and between each paddle and the inside surface of the barrel of the mixer when the stirring shaft rotates, it prevents direct contact of the metallic parts of the paddles with each other or with the metallic part of the inside surface of the barrel. This is one reason for which the reactor can be operated stably over a long period of time.

In a preferred embodiment of the process of this invention, feed screws are provided immediately below the material feed opening, and when the rotating stirring shafts rotate, the reaction mixture is immediately conducted through the screws to a zone having a combination of paddles. Initially, the reaction mixture is a liquid having a viscosity of several centipoises. In a zone into which the reaction mixture has just been introduced, feed screws or a combination of paddles having a great transporting effect is used, and toward a zone in which the reaction mixture changes to a slurry-like mass, a combination of paddles having a gradually decreasing transporting effect is used. In a zone in which the reaction mixture is converted to a finely divided powder, a combination of paddles having a still smaller transporting effect is employed. The degree of decrease of the transporting effect is adjusted depending upon the reaction conditions such as the reaction temperature, the feed rate of the starting mixture, and the amount of the catalyst.

The reactor used in this invention, which is industrially inexpensive and can be built such that the clearance between the edges of paddles and the barrel is not more than 2%, preferably not more than 1%, of the diameter of a circle circumscribing each paddle, has an L/D of not more than 30, preferably not more than 15. Usually, the L/D of the reactor is chosen within the range of from 5 to 30, preferably from 6 to 15. By using this reactor, a sufficient residence time can be secured, and polyacetal of high quality can be obtained at a high conversion. If the L/D of the reactor is less than 5, a sufficiently high conversion is difficult to attain.

In order to obtain the polymerization product as a finely divided powder, the rotating speed of the stirring shaft, as the rotating peripheral speed of the edge of a paddle, is adjusted preferably to 800 to 5000 cm/min. more preferably to 1600 to 4000 cm/min.

In order to perform the process of this invention without troubles, the reaction temperature is adjusted to 60° to 150° C., preferably 65° to 115° C., at which trioxane is maintained liquid. At such high temperatures, polyacetal of high quality can be obtained without inducing an uncontrollable and over-accelerated reaction. If the reaction temperature is lower than 60° C., the rate of reaction decreases, and it is difficult to obtain a sufficiently high conversion. If, on the other hand, the reaction temperature exceeds 150° C., polyacetal of high quality is difficult to obtain because of depolymerization, etc.

Thus, according to this invention, by changing the combinations of paddles so as to change the transporting effect in response to changes in the phase of the reaction mixture, the ratio of filling the reaction mixture in each zone of the reactor can be maintained substantially constant, and therefore, an abnormal rise in rotating torque owing to overfilling or the occurrence of a wasted space in the reaction zone owing to excessively little filling can be prevented. The present invention has the aforesaid advantages, and has made it possible for the first time to continuously polymerize trioxane in bulk with commercial advantages. Furthermore, according to the present invention, the L/D of a continuous bulk polymerization reactor can be controlled within a predetermined range, and thereby, a continuous polymerization process for trioxane using a reactor capable of being continuously operated stably has been established.

The suitable paddle combination and L/D of the continuous bulk polymerization reactor for trioxane in accordance with the present invention have not been disclosed heretofore. Accordingly, the present invention provides a novel and commercially useful technique.

The process of this invention is used to polymerize or copolymerize trioxane. The copolymer contains in the main oxymethylene chain 0.4 to 40 mole%, preferably 0.4 to 10 mole%, of oxyalkylene units having at least 2 carbon atoms. A cyclic ether or cyclic acetal as a comonomer giving the oxyalkylene units is represented, for example, by the following general formula (1).

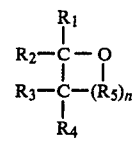

wherein $R_1$, $R_2$, $R_3$ and $R_4$ are identical or different and each represents a hydrogen atom, an alkyl group or a haloalkyl group, $R_5$ represents a methylene or oxymethylene group, or a methylene or oxymethylene group substituted by an alkyl or haloalkyl group in which case n is an integer of 0 to 3, or a divalent group of the formulae $-(CH_2)-OCH_2-$ or $-(O-CH_2-CH_2)_m-O-CH_2-$ in which case n is equal to 1 and m is an integer of 1 to 4. The above alkyl group has 1 to 5 carbon atoms, and its hydrogen atom may be substituted by up to 3 halogen atoms, especially chlorine atoms.

Ethylene oxide, glycol formal and diglycol formal can be cited as the cyclic acetal or cyclic ether. Propylene oxide and epichlorohydrin can also be used. Cyclic formals of long-chain α,ω-diols, such as butanediol formal (i.e., 1,3-dioxepane) and hexanediol formal, are also suitable.

A general cation polymerization catalyst is used as a polymerization catalyst in the process of this invention. In particular, boron fluoride, boron fluoride hydrate, and coordination compounds of oxygen-containing organic compounds with boron fluoride are suitably used. Coordination compounds of boron fluoride with ethers, particularly boron trifluoride etherate [$BF_3 \cdot O(C_2H_5)_2$], are the preferred catalysts. Usually, boron trifluoride etherate is used in an amount of 0.01 to 1 millimole, preferably 0.05 to 0.2 millimole, per mole of trioxane.

In the present invention, the polymerization may be carried out in a relatively small amount of an anhydrous inert medium. The use of inert media serves to control the heat of reaction and the heat of shearing by the latent heat generated by the evaporation of the inert medium, and to perform the reaction smoothly. The inert medium may, or may not, dissolve trioxane, the comonomer and the catalyst. Examples are aliphatic or alicyclic hydrocarbons such as hexane, heptane, and cyclohexane; aromatic hydrocarbons such as benzene, toluene and nitrobenzene; and halogenated hydrocarbons such as dichloroethane and carbon tetrachloride. The suitable amount of the inert medium is generally not more than 10% by weight.

Moreover, in the present invention a chain transfer agent may be conventionally used to control the degree of polymerization of the polymer. The kind of the chain transfer agent is not limited, but general chain transfer agents, for example, alcohols such as methanol and ethanol; phenols such as phenol and 2,6-dimethylphenol; and acetals such as methylol and bis(methoxymethyl)ether, may conveniently be used.

Figure 7:
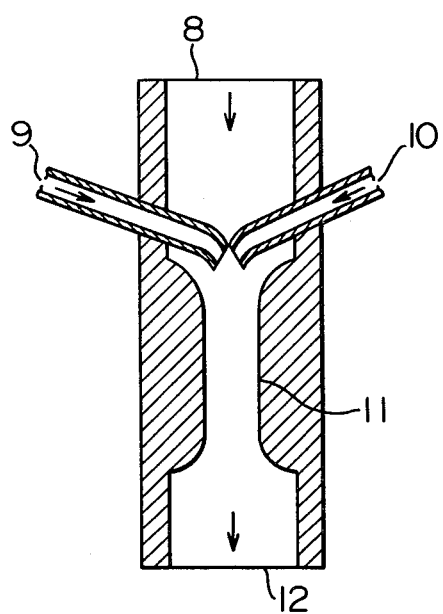
FIG. 7 is a sectional view showing a material mixing device.

In FIG. 1, the material feed opening 5 of the reactor used in this invention is provided at one end of the barrel. The individual components of the starting material, namely trioxane, the catalyst, optionally a comonomer, a chain transfer agent and/or an inert medium, may be mixed immediately prior to introduction into the feed opening 5. In particular, in a continuous reaction of obtaining a polyacetal copolymer by copolymerizing trioxane with a cyclic ether or cyclic acetal, it is advantageous to employ a method wherein the end of a comonomer supply nozzle 9 and the end of a catalyst supply nozzle 10 are opened in proximity to each other, the comonomer and the catalyst at the ends of these nozzles are washed away with a stream of trioxane and mixed, and the resulting mixture is immediately fed into the reactor, as shown in FIG. 7. In FIG. 7, the reference numeral 8 represents a passage for flowing of trioxane; 11, an orifice portion; and 12, an outlet opening for the reaction mixture. Preferably, in the orifice portion, the stream of the reaction mixture is caused to flow at a linear velocity of at least 20 cm/sec. By using such a material mixing device, the starting mixture containing the inert medium in an amount corresponding to not more than 10% by weight of trioxane can be fed in good condition to the reactor without causing the trouble of clogging the end of the feed opening with the scale. The starting mixture, after feeding into the reactor, is transported and mixed and polymerized within a short period of time. The polymerization product is discharged from the discharge opening at the other end of the barrel. The discharge opening 6 is an ordinary opening for discharging the polymerization product as a finely divided solid. If required, a damper 7 for adjusting the amount of the reaction product residing in the reactor may be provided. The residence time in this reactor is usually 0.5 to 30 minutes, preferably 1 to 10 minutes. The polymerization product discharged as a finely divided solid contains not more than 40% by weight, for example not more than 5% by weight, of the unreacted monomer, and as such can be fully subjected to an after-treatment. If, however, it contains more than 5% by weight of the unreacted monomer, it may optionally be introduced immediately into a second-stage continuous mixer and further polymerized until the amount of the unreacted monomer decreases to below 5% by weight. The second-stage mixer may be a continuously stirring-type mixer having the same type as the first-stage reactor, or a horizontal continuous-type mixer having a high heat transmitting surface but the low ability to perform self-cleaning. The horizontal continuous-type mixer may be the one in which the clearance between the outside surface of a stirring impeller and the inside surface of a hollow barrel, or the clearance between the outside surfaces of stirring impellers is not always narrow.

Thus, according to this invention, there is similarly provided a process for producing a homopolymer or copolymer of polyacetal, which comprises polymerizing trioxane with or without a comonomer in the continuously stirring-type mixer under the aforesaid conditions to recover a powdery reaction product containing more than 5% by weight and up to 40% by weight of the unreacted monomer, introducing the reaction product to a second-stage mixer of the type mentioned above directly connected to the aforesaid continuously stirring-type mixer, polymerizing it further therein, and withdrawing the polymerization product containing not more than 5% by weight of the unreacted monomer as a finely divided solid.

In the reaction in the second-stage mixer, the reaction temperature is 20° to 130° C., preferably 40° to 80° C., and the residence time is 5 to 120 minutes, preferably 10 to 100 minutes. In this operation the reaction product undergoes maturation, and is led to completion of polymerization.

Immediately after the polymerization product at a high conversion is discharged from the first-stage mixer or the second-stage mixer in the manner mentioned above, a polymerization stopper is added and mixed with the polymerization product whereby its reaction is stopped. Various known polymerization stoppers can be used. Above all, the tertiary phosphine compounds which the present inventors previously proposed may be used advantageously. Preferably, the addition of the stopper is performed continuously by a continuous-type horizontal mixer directly connected to the reactor. When the second-stage mixer is used, the horizontal mixer for addition of the polymerization stopper is preferably connected directly to the second-stage mixer. According to this construction, the crude polymer whose polymerization has been stopped can be continuously withdrawn from the stopper mixer. In this case, it is preferred that the polymerization reaction system formed of the reactor and optionally also of the second-stage mixer directly connected thereto is a closed system having no other opening than the material feed opening and the product discharge opening, and the stopper mixer is provided with a feed opening for supplying the polymerization product, a discharge opening for the crude polymer and a vent opening provided immediately above the discharge opening. The waste gas generated during the polymerization reaction is recovered from the vent opening of the stopper mixer. The crude polymer whose polymerization has been stopped can be rapidly pulverized to a finer size.

Various pulverizers may be used for pulverizing the crude polymer. Examples are a jaw crusher, a rotary mill, a hammer mill, a feather mill, a rotary cutter mill, a turbomill and a classifying impact pulverizer.

In the case of the copolymerization of trioxane with a cyclic acetal or cyclic ether, a more stabilized polyacetal copolymer can be obtained by admixing a known heat stabilizer with the crude polymer whose polymerization has been stopped by addition of a tertiary phosphine compound, and kneading the mixture at a temperature above the melting point of the polymer to a temperature 100° C. higher than it to decompose and remove an unstable portion. The intrinsic viscosity (measured at 60° C. in p-chlorophenol containing 2% by weight of alpha-pinene) of the resulting copolymer can be adjusted to a desired value, for practical purposes to 1.0 to 2.0, by regulating the polymerization reaction conditions.

The following Examples and Comparative Examples illustrate the embodiments of the present invention.

EXAMPLE 1

A reactor of the type shown in FIG. 1 equipped with paddles shown in FIGS. 2, (A) and (B) was used. The inside diameter D of the barrel was 200 mm, and the L/D of the reactor was 10. In a zone having a length corresponding to 1D, helical forward pass-type paddles were provided such that the ends of the paddles were successively deviated by 45° in a direction opposite to the rotating direction of the stirring shaft (in the negative direction) from the feed opening toward the discharge opening. In the next zone having a length corresponding to 1D, flat paddles deviated successively by 45° in the negative direction were provided. In the next zone having a length corresponding to 5D, flat paddles deviated alternately by 90° and 45° in the negative direction were provided. In the next zone having a length corresponding to 2D, flat paddles deviated alternately by 90° and 45° in the rotating direction (in the positive direction) were provided. In the last zone having a length corresponding to 1D, which was immediately above the discharge opening 6, flat paddles deviated successively by 45° in the positive direction were provided. Each of the paddles had a thickness of 40 mm. The clearance between the sharply worked edges of paddles and the inside surface of the barrel was set at less than 2 mm, and the clearance between the side surfaces of paddles fixed to one stirring shaft and those fixed to the other stirring shaft was set at less than 4 mm.

Liquid trioxane (80 kg/hr), liquefied ethylene oxide (2 kg/hr), and 0.13 millimole, per mole of the trioxane, of a 10% by weight benzene solution of boron trifluoride etherate were mixed in advance in a material mixing device of the type shown in FIG. 7, and the mixture was immediately introduced continuously into the feed opening 5.

The jacket 3 was divided into four equal parts in the longitudinal direction of the barrel, and the temperature of the heating medium was adjusted so that the reaction temperature in these parts was 85° C., 90° C., 95° C., and 110° C., respectively, in the order starting from the feed opening side. The rotating peripheral speed of the end of each paddle was about 2500 cm/min., and the residence time of the reaction mixture was about 4 minutes. The energy of driving was 0.29 KWH per kilogram of trioxane.

The polymerization product containing 4% by weight of the unreacted monomers was recovered from the discharge opening 6 as a finely divided solid. The polymerization product was immediately introduced into a stopper mixing machine which was a continuous-type horizontal mixer including a feed opening for the polymerization product at one end, a discharge opening for the crude polymer at the other end, a vent opening immediately above the discharge opening, a barrel with a cooling jacket fitted over its periphery, and a pair of shafts therein with a number of stirring impellers, said shafts being adapted to rotate in opposite directions for mixing the contents therein. The feed opening of the mixer was directly connected to the discharge opening of the reactor. From the feed opening of the stopper mixer, a 20% by weight benzene solution of triphenylphosphine in an amount of 2 moles per mole of the boron trifluoride etherate was continuously fed. The waste gas generated during the polymerization reaction was recovered from the vent opening of the stopper mixer.

The crude polymer discharged from the stopper mixer was pulverized by a feather mill having a knife rotating at high speeds and being capable of pulverization by a shearing action to such an extent that the entire product could pass through a 10-mesh screen.

In a continuous operation for about 500 hours, the resulting crude polymer had an intrinsic viscosity (measured at 60° C. in p-chlorophenol containing 2% by weight of alpha-pinene) of 1.42 to 1.47 dl/g, and the yield of the polymer was about 96%. During this time, there occurred no abnormal noises owing to contact between metal component parts in the reactor. When the inside of the reactor was inspected after the end of the operation, no scratch was found on the inside surface of the barrel or the side surfaces or edges of the paddles, and the scale on the inside surface of the barrel was maintained in a thickness corresponding to the clearance between the edges of the paddles and the inside surface of the barrel. When the state of the reaction mixture remaining in the reactor was inspected, it was found that in a zone having a length from the end of the feed opening corresponding to 4.5D to 6.5D, the content of the unreacted monomers was 70 to 40% by weight.

One hundred parts by weight of the resulting crude polymer was mixed with 0.5 part by weight of hindered phenolic antioxidant (a trademark "Irganox 259" sold by Ciba-Geigy), 0.2 part by weight of polyvinylpyrrolidone and 0.1 part by weight of calcium hydroxide. The mixture was heat-melted at 210° C. in a vent-equipped single-screw extruder. The molten resin was immediately fed into a twin-screw extruder of the deep channel-type having completely intermeshing screws rotating in the same direction. The extruder was kept at an inside temperature of 210° C., and the crude polymer was stabilized after a residence time of 20 minutes therein under a pressure of 40 torr. As a result of this treatment, the unstable oxymethylene terminals were decomposed and recovered as form-aldehyde gas from the vent opening together with a part of the solvent and the unreacted monomers. A stabilized white resin was extruded as strands from the die head of the extruder. The strands were cut to obtain a final product. The stabilized copolymer had an intrinsic viscosity of 1.45 dl/g, and the rate of weight decrease $K_{air}^{air}$ by heat decomposition at 222° C. in the air was 0.01% by weight/min., and molded articles prepared from this copolymer had the following properties.

| Properties | ASTM designation | Unit | Value |
| --- | --- | --- | --- |
| Tensile strength at yield, ⅛" | D-638 | kg/cm$^2$ | 615 |
| Elongation at break, ⅛" | D-638 | % | 60 |
| Flexural strength, ⅛" | D-790 | kg/cm$^2$ | 855 |
| Izod impact strength, notched ⅛" | D-256 | kg . cm/cm | 60 |
| Tensile impact strength | D-1822 | kg . cm/cm$^2$ | 92 |
| Heat distortion temperature, ¼" 264 psi | D-648 | °C. | 105 |

EXAMPLE 2

A reactor having the same type as used in Example 1 but having an L/D of 7 was used. Convex lens-like paddles with scrapers were fitted. Immediately below the feed opening 5, a feed screw having a length corresponding to 1D was provided. In a subsequent zone having a length corresponding to 0.8D, helical paddles having a thickness of 40 mm were provided so that their ends were deviated successively by 45° in a direction opposite to the rotating direction of the stirring shaft (in the negative direction). In the next zone having a length corresponding to 0.4D, flat paddles having a thickness of 40 mm deviated successively by 45° in the negative direction were provided. In the next zone having a length corresponding to 2D, flat paddles having a thickness of 20 mm deviated repeatedly at deviation angles of 45°, 90° and 90° in the negative direction were provided. In the next zone having a length corresponding to 2.2D, flat paddles having a thickness of 40 mm deviated repeatedly in the negative direction at deviation angles of 45°, 90° and 90° were provided. In the remaining zone having a length corresponding to 0.6D, flat paddles successively deviated by 45° in the direction of the rotating shaft (in the positive direction) were provided. The discharge opening 6 was provided at the bottom of the last zone having a length corresponding to 1D.

Trioxane (80 kg/hr), liquefied ethylene oxide (2.0 kg/hr), and 0.13 millimole, per mole of trioxane, of boron trifluoride etherate were mixed in a material mixer of the type shown in FIG. 7, and the mixture was fed into the reactor. The stirring shafts were rotated so that the peripheral speed of the paddle ends reached about 2500 cm/min. The residence time of the reaction mixture was about 2 minutes. The jacket was divided into three equal parts, and the temperature of the heating medium of the jacket was controlled so that the reaction temperature became 95° C., 95° C. and 100° C. successively downstream from the feed opening side.

The polymerization product discharged from the discharge opening 6 was a finely divided solid containing 22% by weight of the unreacted monomers. In an atmosphere of nitrogen, this polymerization product was immediately sent to a second-stage mixer which was a continuous-type horizontal mixer including a barrel having a jacket at its periphery, and a pair of shafts equipped with a number of stirring impellers, the shafts being adapted to mix the contents while rotating in opposite directions. The feed opening of the second-stage mixer was directly connected to the discharge opening of the reactor, and its discharge opening was directly connected to the same stopper mixer as used in Example 1. In the second-stage mixer, the reaction mixture was maintained at 60° C., and the contents were slowly stirred at a shaft rotating speed of 25 rpm to complete the polymerization. The residence time in the second-stage mixer was 60 minutes. The polymerization product withdrawn from the discharge opening of the second-stage mixer was a finely divided solid which contained less than 1% by weight of the unreacted monomer. The product was admixed with 2 moles, per mole of boron trifluoride etherate, of triphenylphosphine to obtain a crude polymer.

During the continuous operation for about 500 hours, the state of operating the reactor was very stable, and the resulting crude polymer had an intrinsic viscosity of 1.40 to 1.44 dl/g. During the continuous operation, abnormal noises owing to contact of paddles with each other or the ends of the paddles with the inside surface of the barrel did not occur. When the state of the reaction mixture remaining in the reactor after the operation was inspected, the content of the unreacted monomer in a zone having a length corresponding to 2.5D to 4D from the end of the reactor on the feed opening side was 70 to 40% by weight.

EXAMPLE 3

The same reactor as used in Example 1 which had a barrel inside diameter of 50 mm and an L/D of 15 was used. A feed screw having a length corresponding to 2D was provided immediately below the feed opening 5. In the next zone having a length corresponding to 2D, forward pass-type helical paddles whose ends were successively deviated by 45° in a direction opposite to the rotating direction of the stirring from the feed opening toward the discharge opening were provided. In the next zone having a length corresponding to 2D, flat paddles deviated successively by 45° in a direction opposite to the rotating direction were provided. In the next zone having a length corresponding to 7D, flat paddles alternately deviated by 45° and 90° in a direction opposite to the rotating direction were provided. In the next zone having a length of 1D, flat paddles deviated by 90° were provided. In the final zone having a length corresponding to 1D, flat paddles successively deviated by 45° in the rotating direction of the shaft were provided. All of these paddles had a thickness of 10 mm. The clearance between the edge of a paddle worked sharply and the inside surface of the barrel, and the clearance between the edge of a paddle and the side surface of an opposing paddle in the other stirring shaft were both less than 1 mm.

Liquid trioxane (2 kg/hr), ethylene oxide (50 g/hr) and 0.18 millimole, per mole of trioxane, of boron trifluoride etherate were continuously introduced into the feed opening 5. The reaction temperature was adjusted to 75° C. The rotating speed of the stirring shafts was 200 rpm at which the peripheral speed of rotation of the paddle end was about 3100 cm/min. The residence time of the contents of the reactor was about 6 minutes. At this time, the driving energy per kilogram of trioxane was 0.6 KWH.

From the discharge opening 6, a powdery polymerization product containing 30% by weight of the unreacted monomers was obtained. Immediately then, the polymerization product was continuously introduced into a second-stage mixer in an atmosphere of nitrogen gas. The second-stage mixer was a so-called pin mixer comprising a barrel having a jacket on its periphery and a shaft located within the barrel and provided with a number of pins as stirrers. The feed opening of the second-stage mixer was directly connected to the discharge opening 6 of the reactor. The shaft rotating speed of the second-stage mixer was 300 rpm, and the reaction temperature in this mixer was 60° C. The residence time was 1 hour. The polymerization product withdrawn from the second-stage mixer was a finely divided solid containing less than 2% by weight of the unreacted monomers.

To the polymerization product was added triphenylphosphine in an amount of 2 moles per mole of the polymerization catalyst used. Thus, the catalyst was deactivated.

During the continuous operation for about 500 hours, a crude polymer having an intrinsic viscosity of 1.43 to 1.45 dl/g was obtained steadily in a yield of 98.5 to 99.5%.

During the continuous operation for about 500 hours, no abnormal noises due to contact of metallic parts in the first-stage reactor were heard. After the operation, the state of the reaction mixture remaining in the reactor was inspected. It was found that in a zone located at a distance corresponding to 6D to 9D from the end of the reactor on the feed opening side, the amount of the unreacted monomers was 70 to 40% by weight.

EXAMPLE 4

Figure 4:
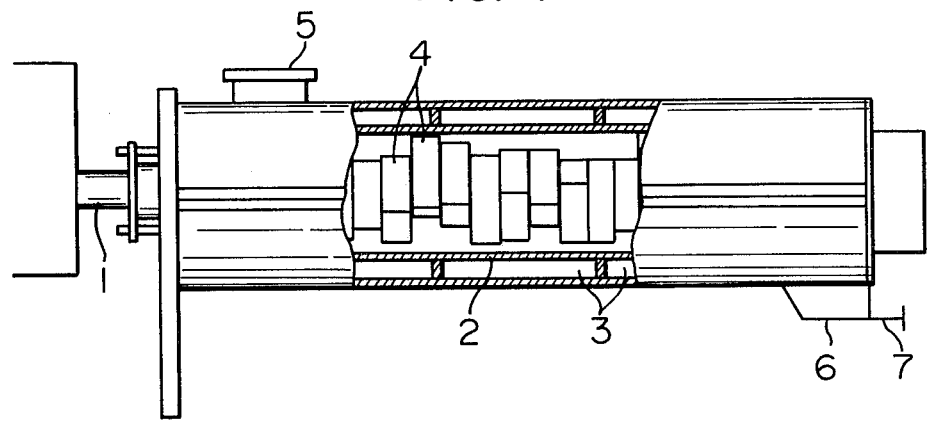
FIG. 4 is a partial sectional side elevation schematically showing another embodiment of the reactor used in this invention.
Figure 6:
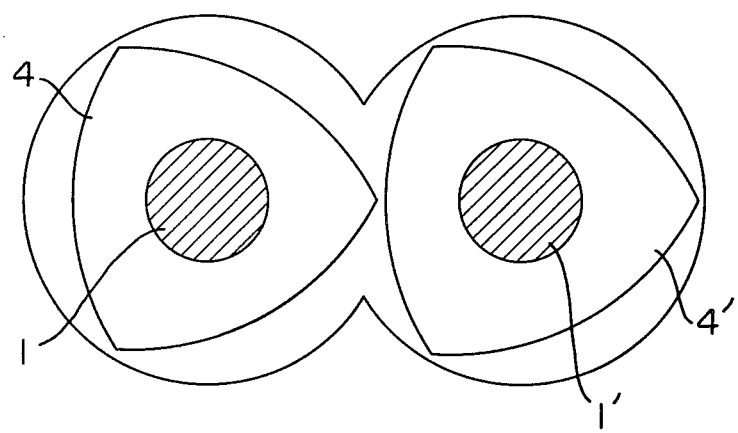
FIG. 6 is a view showing quasitriangular paddles.

A reactor of the type shown in FIG. 4 which had quasitriangular paddles of the type shown in FIG. 6 was used. Trioxane (2 kg/hr), 1,3-dioxepane (70 g/hr) and 0.18 millimole, per mole of trioxane, of boron trifluoride etherate were fed into the reactor after mixing them in a material mixing device of the type shown in FIG. 7.

The barrel of the reactor had an inside diameter D of 50 mm, and its L/D ratio was 15. Intermeshing feed screws having a length corresponding to 1D were fixed immediately below the feed opening 5. In the next zone having a length corresponding to 5D, there were provided paddles whose ends were deviated by 30° in a direction opposite to the rotating direction of the stirring shaft from the feed opening toward the discharge opening. In the next zone having a length corresponding to 4D, paddles were provided at a deviation angle of 60°. In the remaining zone having a length of 5D, paddles deviated by 90° were provided. The discharge opening 6 was provided at the bottom of the front end of the reactor.

The speed of rotation of the stirring shafts was adjusted to 200 rpm at which the rotating peripheral speed of the paddle vertex was about 3100 cm/min.

The reaction temperature was adjusted to 75° C., and the residence time of the reaction mixture in the reactor was about 6 minutes. The finely divided solid discharged from the discharge opening was a copolymer containing 35% of comonomers and having an intrinsic viscosity of 1.43 to 1.45 dl/g.

EXAMPLE 5

Polymerization was performed in the same way as in Example 3 except that paddles having an elliptical shape as shown in FIG. 5 were provided. From the discharge opening 6 of the reactor, the polymerization product containing 32% by weight of the unreacted comonomers was obtained as a finely divided solid.

The polymerization product withdrawn from the second-stage pin mixer contained less than 2% by weight of the unreacted monomers, and had an intrinsic viscosity of 1.40 to 1.44 dl/g.

COMPARATIVE EXAMPLE 1

The same reactor as used in Example 1 which had a barrel inside diameter D of 50 mm and an L/D ratio of 15 was used. Immediately below the material feed opening, intermeshing feed screws having a length of 2D were secured to the stirring shafts. In the remaining zone having a length corresponding to 13D, the same flat paddles having a shape of a convex lens as used in Example 3 were provided so that they were deviated successively by 45° in a direction opposite to the rotating direction of the stirring shafts from the feed opening toward the discharge opening. The clearances were the same as in Example 3.

Trioxane (2 kg/hr), ethylene oxide (50 g/hr) and 0.18 millimole, per mole of trioxane, of boron trifluoride etherate were fed. The reaction temperature was maintained at 50° to 60° C., and the rotating speed of the stirring shafts were adjusted so that the rotating peripheral speed of the paddle end became about 3100 cm/min. It was found that the reaction mixture was discharged from the discharge opening as a liquid or slurry, and its polymerization scarcely proceeded. In order to increase the rate of reaction, the temperature of the heating medium of the jacket was increased so that the reaction temperature became 80° C. When the polymerization was carried out at this temperature, a slurry-like or creamy polymerization product containing 70 to 60% by weight of the unreacted monomers was discharged from the discharge opening. When this product was fed into a non-selfcleaning second-stage mixer, it adhered to the inside surface of the barrel or to the shafts, or became a lumpy mass and caused complete failure of operation.

Then, the rotating speed of the stirring shafts of the reactor was adjusted so that the rotating peripheral speed of the paddle end became as small as 300 cm/min., and the polymerization was performed at a reaction temperature of 80° C. The polymerization product discharged was a coarse granule in which 40% by weight of the entire particles could not pass a 10-mesh sieve. The polymerization product also contained 50 to 45% by weight of the unreacted monomers.

COMPARATIVE EXAMPLE 2

Polymerization was performed by using the same reactor as used in Comparative Example 1. Immediately below the material feed opening, intermeshing feed screws having a length corresponding to 2D were secured to the shafts, and in the remaining zone having a length corresponding to 13D, flat paddles having a shape of a convex lens were provided such that they were successively deviated by 90° C. The clearances were the same as in Example 3.

Trioxane (2 kg/hr), ethylene oxide (50 g/hr) and 0.18 millimole, per mole of trioxane, of boron trifluoride etherate were fed into the reactor. The reaction temperature was maintained at 50° to 60° C., and the rotating speed of the stirring shafts was adjusted so that the rotating peripheral speed of the paddle end became 3100 cm/min.

In 10 minutes after starting of the operation, a shear pin was broken, and the rotation of the stirring shafts of the reactor failed. The reactor was opened, and inspected. It was found that in a zone from a point 2D away from the feed opening to a point 8D away from the feed opening, the polymer completely filled the free space. For this reason, the shafts were totally unable to rotate, and the shear pin which was mounted so as to avoid fracture of the driving part was broken.

What we claim is:

1. In a process for producing a polyacetal homopolymer or copolymer which comprises continuously feeding a liquid starting mixture containing molten trioxane and a catalyst and optionally a comonomer through a feed opening of a reactor, said reactor being a continuously stirring type mixer comprising a hollow barrel having in spaced-apart relationship said feed opening for the starting materials and a discharge opening for the reaction product, said barrel having a cross-sectional surface corresponding to two overlapping eccentric circles having the same diameter, a jacket provided on the periphery of the barrel for temperature control, and stirring shafts disposed within the hollow barrel parallel to each other and extending longitudinally of the barrel through the central parts of said circles, said stirring shafts having a plurality of plate-like paddles fixed thereto in such a manner that the paddles fixed to one stirring shaft are kept in contact with each other, the cross-section of each of said paddles taken perpendicularly of the axial direction of the stirring shaft having a shape of a convex lens, an ellipse or a quasipolygon inscribing a phantom circle at each vertex, one of said paddles facing another paddle fixed to the other stirring shaft and said one paddle being positioned such that it rotates while the edges thereof keep a slight clearance from the inner surface of the barrel and the other paddle; polymerizing the starting mixture while moving it toward the discharge opening by the rotation of the paddles; and withdrawing the reaction product in the form of a finely divided solid from the discharge opening; the improvement wherein the arrangement of the paddles is changed continuously or stepwise such that with respect to one paddle on the same stirring shaft, a paddle adjacent thereto on the discharge opening side of the reactor is deviated by an angle of less than 180° in a direction opposite to the rotating direction of the stirring shaft, so that the transportability of the reaction mixture becomes progressively smaller from the feed opening toward the discharge opening of the reactor.

2. The process of claim 1 wherein at least one of the paddles is a helical paddle and/or an inverse helical paddle.

3. The process of claim 1 wherein the paddles have a shape of a convex lens or an ellipse, and on the same stirring shaft, the paddles are arranged such that with respect to one paddle, a paddle adjacent thereto on the discharge opening side of the reactor is deviated by an angle of not more than 135° in a direction opposite to the rotating direction of the stirring shaft.

4. The process of claim 3 wherein on the same stirring shaft, the paddles are arranged such that with respect to one paddle, a paddle adjacent thereto on the discharge opening side of the reactor is deviated by an angle of 45°, 90° or 135° in a direction opposite to the rotating direction of the stirring shaft.

5. The process of claim 3 wherein in a zone of the reactor through which the reaction mixture containing at least 50% by weight of the unreacted monomer passes, the paddles fixed to the same stirring shaft are arranged such that with respect to one paddle, a paddle adjacent thereto on the discharge opening side of the reactor is deviated by an angle of not more than 90° in a direction opposite to the rotating direction of the stirring shaft.

6. The process of claim 5 wherein the reaction mixture contains at least 60% by weight of the unreacted monomer.

7. The process of claim 5 or 6 wherein on the same stirring shaft, the paddles are arranged such that with respect to one paddle, a paddle adjacent thereto on the discharge opening side of the reactor is deviated by an angle of 45° or 90° in a direction opposite to the rotating direction of the stirring shaft.

8. The process of claim 3 wherein in a zone of the reactor through which the reaction mixture containing less than 50% by weight of the unreacted monomer, the paddles on the same stirring shaft are arranged such that with respect to one paddle, a paddle or paddles adjacent thereto on the discharge opening side of the reactor are deviated in a direction opposite to the rotating direction of the stirring shaft by an angle of 45° and then by an angle of 90° in an alternating manner, and/or repeatedly by an angle of 45°, 90° and then 90°.

9. The process of claim 3 wherein a zone near the discharge opening of the reactor through which the reaction mixture containing less than 50% by weight of the unreacted monomer, the paddles on the same stirring shaft are arranged such that with respect to one paddle, a paddle or paddles adjacent thereto on the discharge opening side of the reactor are deviated in a direction opposite to the rotating direction of the stirring shaft by an angle of 90° or 135°, or by an angle of 90° and then 135° in an alternating manner, and/or repeatedly by an angle of 90°, 90° and then 135°.

10. The process of claim 3 wherein in a zone of the reactor through which the reaction mixture containing at least 50% by weight of the unreacted monomer passes, the paddles on the same stirring shaft are arranged such that with respect to one paddle, a paddle adjacent thereto on the discharge opening side of the reactor is deviated by an angle of 45° in a direction opposite to the rotating direction of the stirring shaft in an area near the feed opening of the reactor, and that in a subsequent area, the adjacent paddles are deviated alternately by an angle of 45° and then 90°, and/or repeatedly by an angle of 45°, 90° and then 90° in the same direction.

11. The process of claim 3 wherein on the same stirring shaft, the paddles are arranged such that with respect to one paddle, a paddle or paddles adjacent thereto are deviated by an angle of 45° in a direction opposite to the rotating direction of the stirring shaft in a zone near the feed opening; alternately by an angle of 45° and then 90° in the same direction and/or repeatedly by an angle of 45°, 90° and then 90° in the same direction in a subsequent zone including a site where the unreacted monomer content of the reaction mixture is 50% by weight; and by an angle of 135° in the same direction, or alternately by an angle of 90° and then 135° in the same direction, and/or repeatedly by an angle of 90°, 90° and then 135° in the same direction in a subsequent zone on the discharge opening side.

12. The process of claim 1 wherein both edges of each paddle in the direction of its long axis are sharpened, and each paddle has a cross-sectional surface having a shape of a convex lens in which a plane including the long axis is a symmetrical surface.

13. The process of claim 1 wherein each paddle has a sharp scraper at both ends in the direction of its long axis, and has a cross-sectional surface having a shape of a convex lens in which a plane including the long axis is not a symmetrical surface.

14. The process of claim 1 wherein a feed screw is secured to a part of each stirring shaft which is near the feed opening of the reactor.

15. The process of claim 1 wherein the clearance between the edge of each paddle and the inside surface of the barrel is not more than 2% of the diameter of a circle circumscribing the paddle, and the clearance between the edge of one paddle fixed to one of the shafts and the side surface of a mating paddle fixed to the other shaft is not more than 5 times as large as the first-mentioned clearance.

16. The process of claim 1 wherein the clearance between the edge of each paddle and the inside surface of the barrel is not more than 1% of the diameter of a circle circumscribing the paddle, and the clearance between the edge of one paddles fixed to one of the shafts and the side surface of a mating paddle fixed to the other shaft is not more than 2 times as large as the first-mentioned clearance.

17. The process of claim 1 wherein the ratio of the length L of the barrel to the diameter D of each of said eccentric circles, i.e., L/D, is from 5 to 30.

18. The process of claim 17 wherein the L/D ratio is from 6 to 15.

19. The process of claim 1 wherein the rotating speed of the stirring shafts is adjusted such that the rotating peripheral speed of the end of each paddle is 800 to 5,000 cm/min.

20. The process of claim 1 wherein the polymerization temperature is from 60° to 150° C.

21. The process of claim 1 wherein the polymerization temperature is from 65° to 115°.

22. The process of claim 1 wherein the catalyst is boron trifluoride etherate.

23. The process of claim 1 wherein the comonomer is ethylene oxide.

24. In a process for producing a polyacetal homopolymer or copolymer which comprises continuously feeding a liquid starting mixture containing molten trioxane and a catalyst and optionally a comonomer through a feed opening of a reactor, said reactor being a continuously stirring-type mixer comprising a hollow barrel having in spaced-apart relationship said feed opening for the starting materials and a discharge opening for the reaction product, said barrel having a cross-sectional surface corresponding to two overlapping eccentric circles having the same diameter, a jacket provided on the periphery of the barrel for temperature control, and stirring shafts disposed within the hollow barrel parallel to each other and extending longitudinally of the barrel through the central parts of said circles, said stirring shafts having a plurality of plate-like paddles fixed thereto in such a manner that the paddles fixed to one stirring shaft are kept in contact with each other, the cross-section of each of said paddles taken perpendicularly of the axial direction of the stirring shaft having a shape of a convex lens, an ellipse or a quasipolygon inscribing a phantom circle at each vertex, one of said paddles facing another paddle fixed to the other stirring shaft and said one paddle being positioned such that it rotates while the edges thereof keep a slight clearance from the inner surface of the barrel and the other paddle; polymerizing the starting mixture while moving it toward the discharge opening by the rotation of the paddles; withdrawing the reaction product containing more than 5% by weight but not exceeding 40% by weight of the unreacted monomer or monomers from the discharge opening as a finely divided solid; thereafter introducing the reaction product into a continuously stirring-type mixer of the same type as said reactor or into a horizontal continuous-type mixer of a structure in which the clearance between the outside surface of each stirring impeller and the inside surface of the barrel of the mixer, or the clearance between the outside surfaces of stirring impellers is not always narrow, said mixer being directly connected to said reactor and polymerizing the reaction mixture further; and withdrawing the polymerization product containing the unreacted monomer or monomers in an amount of not more than 5% by weight as a finely divided solid; the improvement wherein the arrangement of the paddles is changed continuously or stepwise such that with respect to one paddle on the same stirring shaft, a paddle adjacent thereto on the discharge opening side of the reactor is deviated by an angle of less than 180° in a direction opposite to the rotating direction of the stirring shaft, so that the transportability of the reaction mixture becomes progressively smaller from the feed opening toward the discharge opening of the reactor.

* * * * *